United States Patent [19]

Graham et al.

[11] Patent Number: 4,664,796

[45] Date of Patent: May 12, 1987

[54] FLUX DIVERTING FLOW CHAMBER FOR HIGH GRADIENT MAGNETIC SEPARATION OF PARTICLES FROM A LIQUID MEDIUM

[75] Inventors: Marshall D. Graham, Framingham, Mass.; William G. Graham, Lexington, Ky.

[73] Assignee: Coulter Electronics, Inc., Hialeah, Fla.

[21] Appl. No.: 776,567

[22] Filed: Sep. 16, 1985

[51] Int. Cl.⁴ .......................... B01D 35/06; B03C 1/02

[52] U.S. Cl. ...................................... 210/222; 55/100; 210/239; 210/408; 210/409; 210/927

[58] Field of Search ............... 210/222, 223, 407, 408, 210/409, 695, 748, 927, 239; 252/62.9; 55/100; 435/2

[56] References Cited

U.S. PATENT DOCUMENTS

| | | | |
|---|---|---|---|
| 2,329,893 | 9/1943 | Girard | 210/222 |
| 2,823,803 | 2/1958 | Sinclair et al. | 210/222 |
| 3,142,787 | 7/1964 | Levesque | 317/159 |
| 3,164,756 | 1/1965 | Steingroever | 317/159 |
| 3,367,612 | 2/1968 | Usiskin | 248/124 |
| 3,375,925 | 4/1968 | Carpenter | 209/214 |
| 3,489,280 | 1/1970 | Israelson et al. | 209/223 |
| 3,567,026 | 3/1971 | Kolm | 210/222 |
| 3,616,925 | 11/1971 | Turnock | 210/222 |
| 3,700,555 | 10/1972 | Widmark et al. | 435/2 |
| 3,709,791 | 1/1973 | Lichtenstein | 435/294 |
| 3,812,629 | 5/1974 | Campbell | 51/216 R |
| 3,869,390 | 3/1975 | Heitmann et al. | 210/222 |
| 3,890,241 | 6/1975 | Nishida et al. | 252/62.9 |
| 4,051,023 | 9/1977 | Fogle et al. | 209/223 |
| 4,054,513 | 10/1977 | Windle | 210/222 X |
| 4,055,824 | 10/1977 | Baermann | 335/283 |
| 4,116,829 | 9/1978 | Clark et al. | 210/222 X |
| 4,188,296 | 2/1980 | Fujita | 210/222 |
| 4,190,524 | 2/1980 | Watson | 210/222 |
| 4,244,822 | 1/1981 | Slavens | 210/222 |
| 4,247,398 | 1/1981 | Mohri | 210/222 |
| 4,250,478 | 2/1981 | Carbone et al. | 335/288 |
| 4,251,791 | 2/1981 | Yanagisawa et al. | 335/302 |
| 4,261,815 | 4/1981 | Kelland | 209/213 |
| 4,314,219 | 2/1982 | Haraguchi | 335/295 |
| 4,422,933 | 12/1983 | Sverre et al. | 210/222 |
| 4,544,482 | 10/1985 | Rupp | 210/222 |

FOREIGN PATENT DOCUMENTS

| | | | |
|---|---|---|---|
| 119475 | 10/1978 | Japan | 210/695 |
| 58946 | 5/1979 | Japan | 210/222 |
| 1578396 | 11/1980 | United Kingdom | 210/222 |

OTHER PUBLICATIONS

"Permanent Magnets", McCaig, Halstead Press Willox & Sons, New York, 1977, pp. 240–247.

"Use of Superconducting Magnets in Magnetic Separation", Journal de Physique, Parker, Jan. 1984, pp. Cl-753–758.

"Countinuous Flow Separation, an Application of Selective Magnetiosedimentation", van Kleef, Journal de Physique, Jan. 1984, pp. Cl-763–766.

*Primary Examiner*—Richard V. Fisher
*Assistant Examiner*—W. Gary Jones
*Attorney, Agent, or Firm*—Lahive & Cockfield

[57] ABSTRACT

A system for the magnetic separation of fragile particles, such as intact biological cells, from a fluid medium. The system includes at least one high-gradient magnetic separator having a flow chamber housing an interstitial separation matrix and associated magnetizing apparatus for coupling magnetic flux to the matrix. The matrix has interstices through which a carrier fluid carrying the cells-to-be-separated may be passed. The magnetizing apparatus includes opposing North and South poles and field-guiding pole pieces, external to the flow chamber. The flow chamber comprises a dual-position flux-coupler. The flux-coupler is operative in a first position in the capture phase and in a second position in an elutriation phase. In the capture phase, the flux-coupler is positioned to permit the magnetic flux from one magnetic pole to pass through the matrix to the other magnetic pole. As the carrier fluid flows through the interstices of the matrix in this phase, particles, such as blood cells, in the input fluid are retained in the matrix, where magnetic forces dominate gravitational and viscous forces. In the elutriation phase, the flux-coupler is positioned so that magnetic flux is diverted from the matrix. In this phase, magnetic flux is greatly reduced in the matrix, permitting viscous forces to the fluid to remove the magnetic particles from the matrix at low flow velocities.

16 Claims, 13 Drawing Figures

FIG. 10
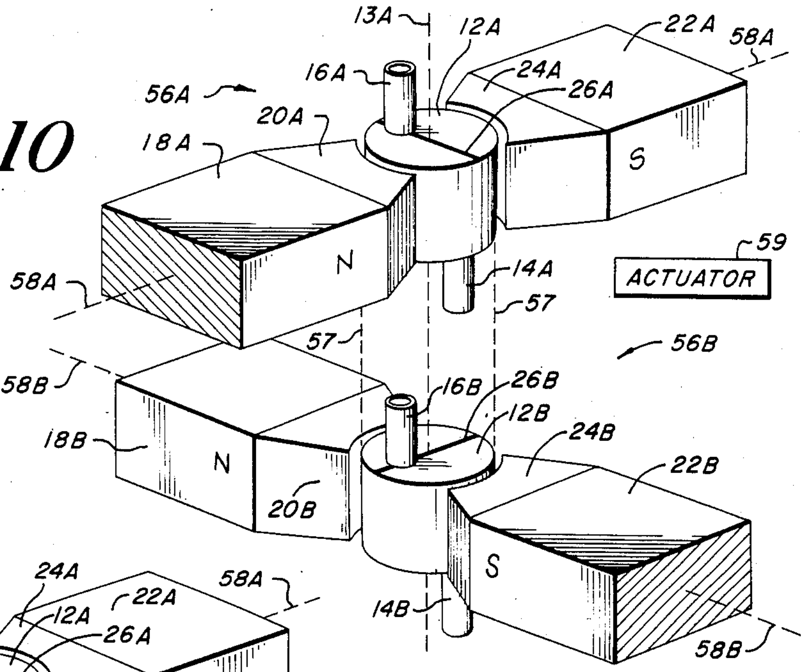
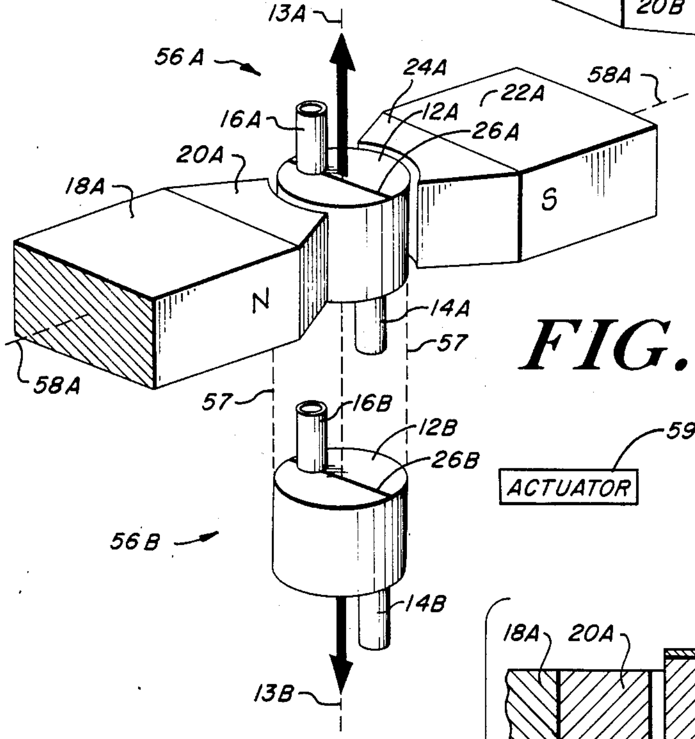
FIG. 11
FIG. 12
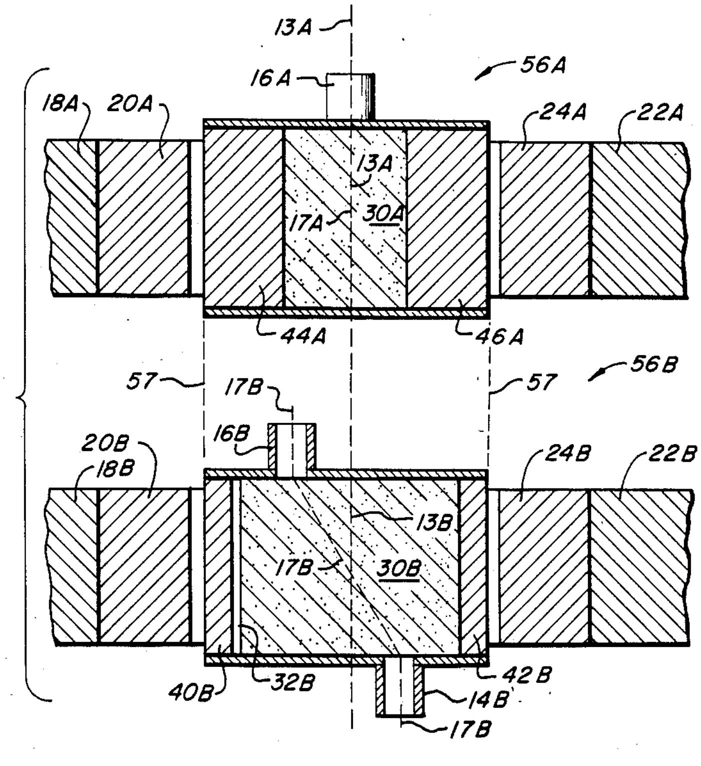

FLUX DIVERTING FLOW CHAMBER FOR HIGH GRADIENT MAGNETIC SEPARATION OF PARTICLES FROM A LIQUID MEDIUM

REFERENCE TO RELATED APPLICATION

The subject matter of this application is related to the subject matter of U.S. application Ser. No. 776,699 entitled "Apparatus For Acoustically Removing Particles from a Magnetic Separation Matrix" filed on even date herewith. That application is incorporated herein by reference.

BACKGROUND OF THE DISCLOSURE

The present invention is in the field of instrumentation and more particularly relates to apparatus for magnetically separating particles from a liquid medium.

The magnetic separation of solid material from a fluid medium has been accomplished in the prior art for processes where there was no concern for the integrity of the separated material. By way of example, processes are well known for separation of iron oxides from a mineral slurry. In practice, these separation processes lead to harsh physical interaction among the separated particles as well as between the separated particles and the separation matrix. Generally, there is no need in such fields of magnetic separation to be concerned about the intactness of the separated particles, although there is often concern with maintaining the integrity of the matrix.

In other applications of magnetic separation, there is a concern about integrity of separated particles. For example, there is the need to separate intact living, biological cells from a fluid carrier, so that those cells may be analyzed. As another example, a fragilely connected aggregate of particles may be considered as a "particle" for which separation from a carrier fluid is desired while maintaining the aggregate relationship. One known separation technique useful in these fields is high-gradient magnetic separation, HGMS.

In prior art HGMS systems, the collection of particles occurs on a matrix of magnetic wires, fibers, spheres or other high permeability members situated in a magnetic flux. Generally, such matrices are characterized by interstitial spaces through which the particles and carrier fluid may pass. As the particles pass through the matrix, each particle experiences a magnetic force toward the matrix elements proportional to $$(\psi_p - \psi_f)\, V_p H dH/dx,$$

where $\psi_p$ is the susceptibility of the particle, $\psi_f$ is susceptibility of the carrier fluid, $V_p$ is the volume of the particle, H is the magnetic field intensity and x is a spatial dimension away from the matrix surface. In a paramagnetic mode of operation, where $\psi_p$ exceeds $\psi_f$, that is where the particles are more "magnetic" than the carrier fluid, the particles are attracted to the elements of the matrix in the "strong field" regions at those elements. In a diamagnetic mode of operation, where $\psi_f$ exceeds $\psi_p$, that is, where the carrier fluid is more "magnetic" than the particles, the particles are repelled from the strong field regions, but may be attracted to the weak or low field regions, at the matrix elements.

In a capture phase of operation, a fluid carrying the particles-to-be-separated is passed through the matrix at flow rates sufficiently low that magnetic attractive forces on the particles in the matrix exceed viscous and gravitational forces. As a consequence, those particles are held, or captured, against portions of the matrix while the carrier fluid exits the matrix. An elutriation phase may then be initiated to retrieve the captured particles from the matrix, for example, for subsequent analysis.

In HGMS systems where the magnetic flux is generated by an electromagnet, or by a permanent magnet whose flux is by some means removed from the matrix during the elutriation phase, particles can be released from the matrix following their collection from the particle-laden carrier by first interrupting drive current to the winding of the electromagnet, or removing the permanent magnet flux from the matrix. However, residual magnetism in the system may cause some particles to be held by the matrix. Then the velocity at which the elutriation fluid is driven through the matrix may be selectively increased to remove the non-released particles from the matrix.

In HGMS systems where the magnetic flux is generated by permanent magnets, and the matrix is maintained within the magnetic flux path at all times, that flux may continue to cause retention of the captured particles even upon the introduction of an elutriation fluid. The common method for elutriating the captured particles in this case is to appreciably increase fluid flow rates, so that the viscous drag forces exceed the magnetic retention forces; the captured particles are thus flushed off the matrix. This latter approach has been widely used with inorganic particles, but has been less successful when applied to separation of fragile particles such as intact living biological cells. Cellular debris observed in the flush effluent, particularly when old bloods are subjected to this method of cell elutriation, demonstrate that the method is too harsh for use with many clinical specimens.

It is an object of the present invention to provide an improved apparatus for magnetically removing particles from a fluid medium.

Another object is to provide an improved apparatus for magnetically capturing, and providing the intact removal therefrom of, fragile particles in a fluid medium.

Yet another object is to provide an improved apparatus for magnetically capturing, and providing the removal therefrom of, intact biological cells from a fluid medium.

SUMMARY OF THE INVENTION

The invention is directed to the magnetic separation of fragile particles, such as intact biological cells, from a fluid medium. Specifically, the invention provides a high gradient magnetic separation (HGMS) system having both a flow chamber housing an interstitial separation matrix and associated magnetizing apparatus for coupling magnetic flux to the matrix. The interstitial matrix includes high magnetic permeability wires, fibers, spheres or the like and has interstices through which a carrier fluid carrying the cells-to-be-separated may be passed. The magnetizing apparatus includes a permanent magnet having opposing North and South poles and field-guiding pole pieces, external to the flow chamber. The flow chamber comprises a dual-position flux-coupler. The flux-coupler is operative in a first position in the capture phase and in a second position in an elutriation phase.

In the capture phase, the flux-coupler is positioned to permit the magnetic flux from one magnetic pole to pass through the matrix to the other magnetic pole. As the carrier fluid flows through the interstices of the matrix in this phase, input fluid particles for which the magnetic attractive forces exceed viscous and gravitational forces (such as blood cells) are retained in the matrix.

In the elutriation phase, the flux-coupler is positioned so that magnetic flux is diverted away from the matrix. In this phase, the appreciable reduction or elimination of magnetic flux from the matrix permits viscous forces of the fluid to remove the captured particles from the matrix at low flow velocities. A HGMS system of the type taught by the invention is capable of non-destructively separating fragile particles, e.g., intact blood cells, from a carrier fluid.

In accordance with another aspect of the invention, an acoustic removal apparatus is incorporated into the flux diverting flow chamber to aid in dislodging captured particles from the matrix in the elutriation phase. The acoustical removal apparatus includes a piezoelectric transducer, which is acoustically coupled to the matrix, and an associated drive circuit. By way of example, the piezoelectric transducer may be affixed to a wall of the chamber housing the matrix with the transducer being in fluid communication with the matrix. Alternatively, the piezoelectric transducer may be mechanically coupled to the matrix.

With this aspect of the invention, the HGMS system may operate with the flux coupler in its first position and otherwise operate in a conventional manner in the capture phase, whereby fragile particles are selectively captured magnetically from a carrier fluid passing through the matrix, with those captured particles being held in place within the matrix.

In the elutriation phase, with the flux coupler in its second position so that flux is diverted from the matrix, an elutriation fluid is passed through the matrix. For applications where minimum elutriation velocities are essential, the drive circuit excites the piezoelectric transducer. In response to the excitation, the transducer establishes acoustic waves in the elutriation fluid passing through the matrix, vibrating the matrix itself. Depending upon the mechanical impedances within the flow chamber, the acoustic waves may be ultrasonic. The acoustic waves and matrix vibration operate to dislodge the intact cells from the matrix, permitting even lower elutriation flow rates than may be necessary using the flux-diverting features of the invention alone.

In various forms of the invention, a single separator can be used, or alternatively, pairs of mechanically coupled separators can be arranged in dual separator configurations.

BRIEF DESCRIPTION OF THE DRAWINGS

The foregoing and other objects of this invention, the various features thereof, as well as the invention itself, may be more fully understood from the following description, when read together with the accompanying drawings in which:

FIGS. 6–11 show dual separator embodiments of the invention;

FIG. 12 shows a sectional view of the dual separator embodiment of FIG. 6.

DESCRIPTION OF THE PREFERRED EMBODIMENT

Figure 1:
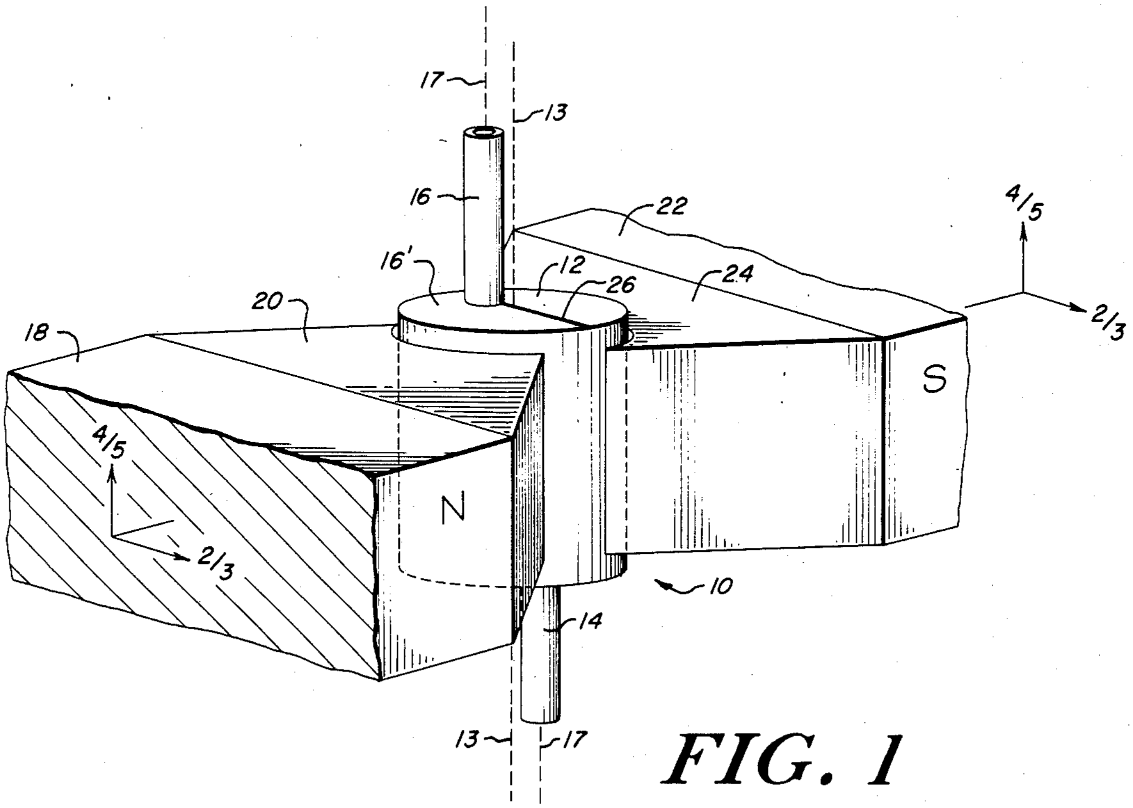
FIG. 1 shows a perspective view of a separator constructed in accordance with the present invention.

FIGS. 1–5 show a separator 10 for a high-gradient magnetic separation (HGMS) system. The separator 10 of the present embodiment is disclosed with a permanent magnet for generating the magnetic field used in particle separation. The invention is also applicable to an electromagnet-based HGMS system, where the separation magnetic field is generated with an electromagnet and the removal of captured particles may be achieved either with the magnet energized or de-energized.

The separator 10 includes a generally cylindrical flow chamber 12 extending along a reference axis 13 and having an input port 14 and an end member 14' and an output port 16 and an end member 16'. In other forms of the invention, additional input and output ports can also be provided for flow chamber 12. In the presently described embodiment, the axis 13 is aligned with the local vertical. The chamber 12 is adapted to permit fluid flow from the port 14 to the port 16 generally along the flow axis 17. A permanent magnet assembly is exterior to the chamber 12. The magnet assembly includes a North pole 18 and associated high permeability field-converging pole piece 20 and a South pole 22 and associated high permeability field-converging pole piece 24. The pole pieces 20 and 24, together with the flow chamber 12, establish a flux path between the poles 18 and 22. For permanent magnet embodiments, the poles 18 and 22 may be provided by a single "horseshoe", or C-shaped, magnet. For electromagnet embodiments, conventional-type electromagnets and energizing circuits, not shown, may be used. A reference line 26 is shown on the end piece 16' which passes through axis 13 and axis 17. That reference line 26 is indicative in the Figures of the angular orientation of the chamber 12 about axis 13.

As shown in the sectional views of FIGS. 2–5, the chamber 12 includes a high permeability, interstitial separation matrix 30. The matrix 30 is positioned along the axis 17 within the flow chamber 12 in a manner such that fluid driven between the ports 14 and 16 passes substantially through the matrix 30. The matrix 30 is a high permeability assembly constructed of magnetic wires, fibers, spheres, or the like, in a conventional fashion, having interstices large enough to permit the carrier fluid and particles to flow therethrough. By way of example, the matrix elements may be 5–15% of the chamber's interior volume.

As shown in FIGS. 1–5, within the matrix 30, the flow axis 17 is offset with respect to the reference axis 13, which in this embodiment is aligned with the local vertical. In other forms of the invention, the flow axis 17 may be offset from the vertical at any angle in the range zero to ninety degrees. Optimally, the offset of the axis 17 is substantially equal to forty-five degrees, although other orientations may be used. In the illustrated embodiment with the input 14 lower than the exit port 16, the fluid flow through the chamber 12 includes a directed component opposite to the local gravitational field. As a result, the gravitational field assists the separation process by causing a relative slowing of the particle flow in the carrier fluid.

Figure 2:
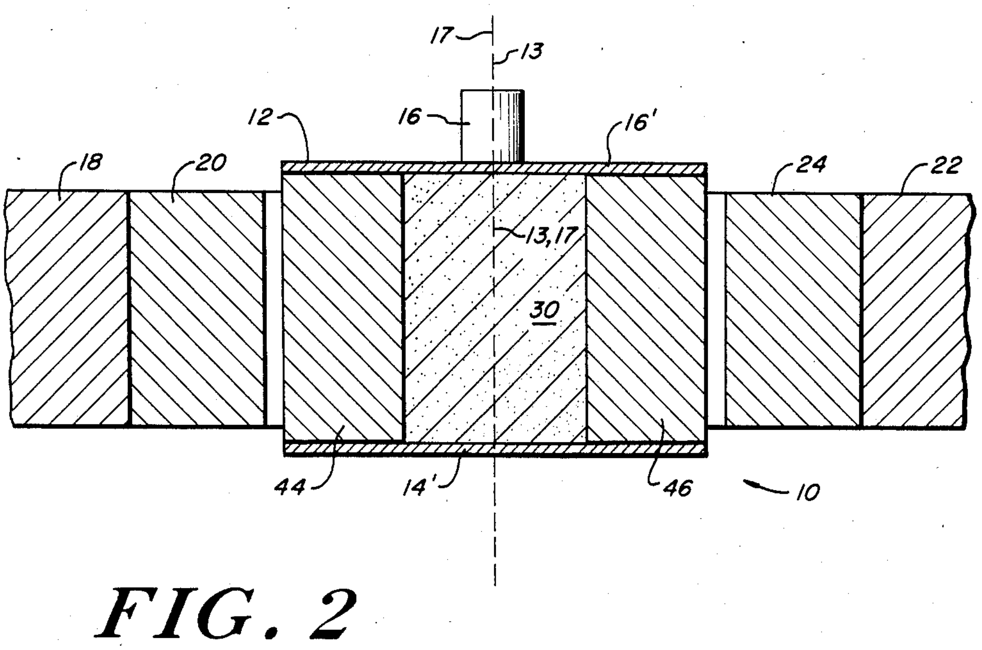
FIGS. 2 and 3 show vertical sectional views of the separator of FIG. 1.
Figure 3:
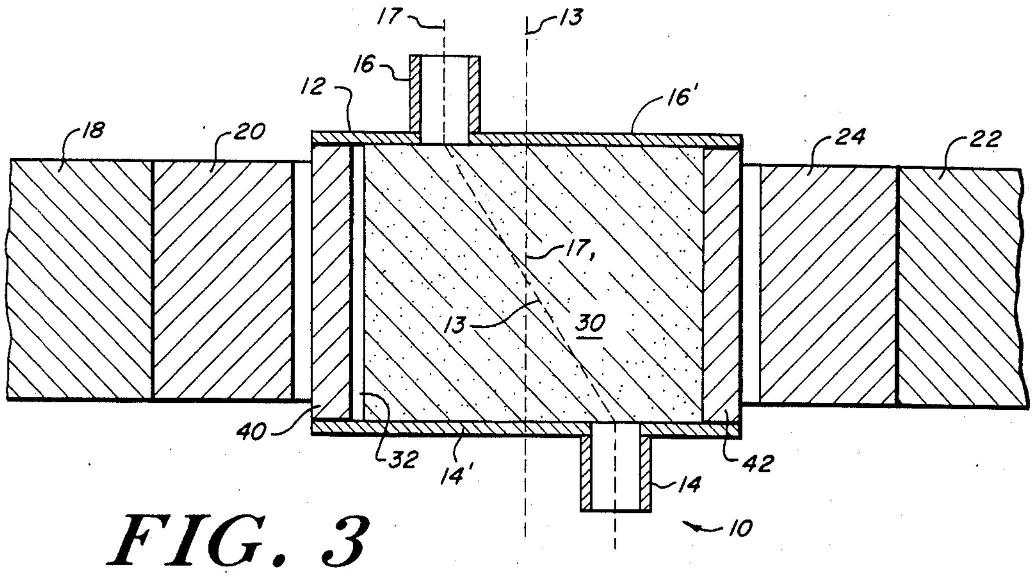
Figure 4:
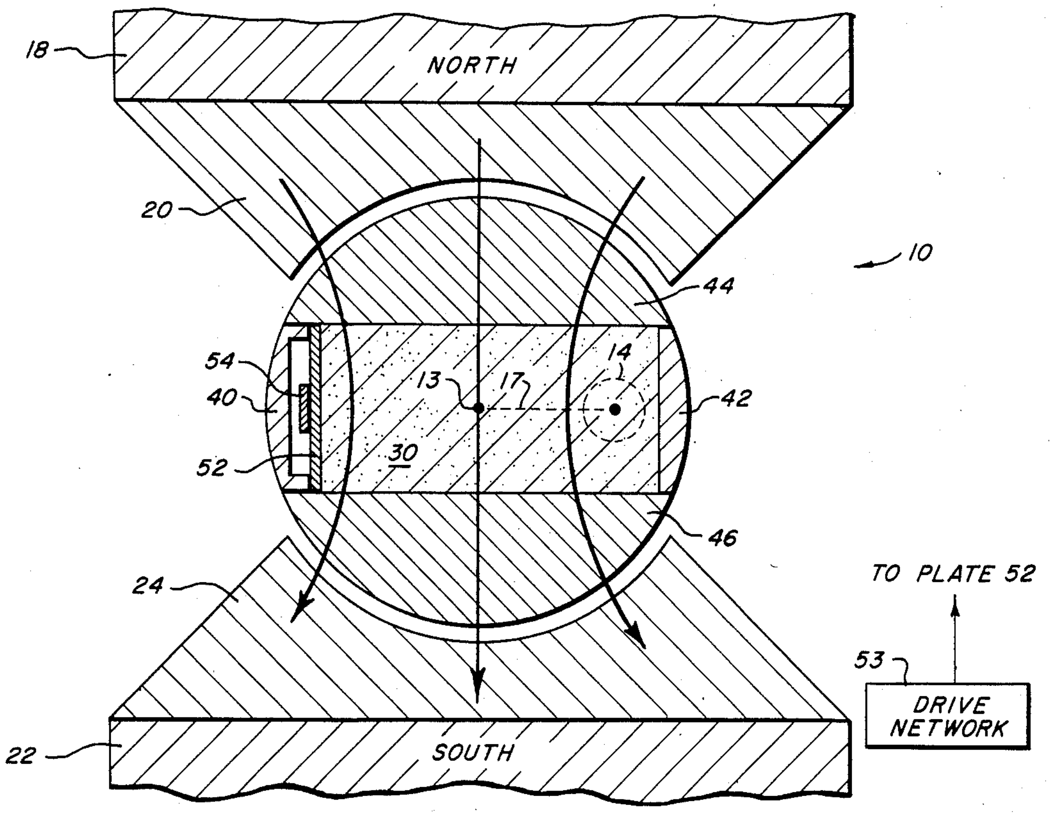
FIGS. 4 and 5 show horizontal sectional views of the separator of FIG. 1.
Figure 5:
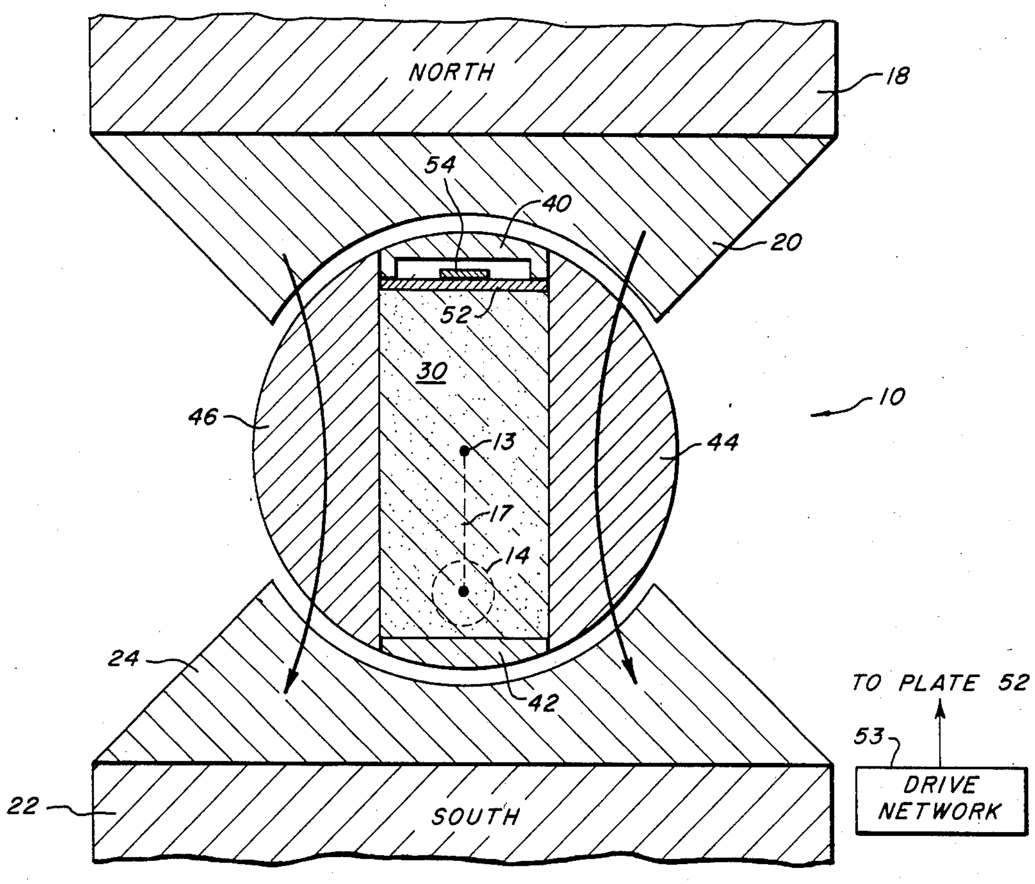

In the preferred embodiment, the chamber 12 is formed from cylindrical section sidewall members 40 and 42, which are non-magnetic, i.e. having low magnetic permeability, and cylindrical section sidewall members 44 and 46, which are magnetic. The outer surface of the members 40, 42, 44 and 46 form a cylindrical surface coaxial with the reference axis 13. The entire flow chamber 12 is selectively rotatable about the axis 13 so that in a first position as shown in FIGS. 1, 2 and 4, a flux path is established from the pole 18 through the pole piece 20, sidewall member 44, matrix 30, sidewall member 46, and pole piece 24 to the pole 22. In a second position of the chamber 12, where the chamber 12 is offset by ninety degrees with respect to the first position, as shown in FIGS. 3 and 5, a low-reluctance flux path is established from the pole 18 through the pole piece 20, through both sidewall members 44 and 46, and the pole piece 24 to the pole 22, so that the flux substantially by-passes the matrix 30. The principal flux paths for the two positions of the chamber 12 are indicated by the arrows in FIGS. 4 and 5, respectively. In the illustrated embodiment the reluctance of the principal flux path illustrated in FIG. 4 is relatively high compared to that of the principal flux path illustrated in FIG. 5.

While not necessary for all aspects of the present invention, in another embodiment a piezoelectric plate 52 is mounted in or on one wall (e.g. wall 40) of the chamber 12. The plate 52 is coupled to a drive network 53. A back-loading element 54 may be used for quarter-wave impedance matching of the load to the piezoelectric plate 52, as is known in the art of ultrasonic transducers. In the illustrated embodiment the plate 52 is mounted on, but electrically insulated from, the sidewall 40 of the chamber 12 and is in mechanical contact with the matrix 30. In other forms of the invention, the plate 52 may be spaced apart from (but in fluidic coupling with) the matrix 30. The plate 52 may be exposed to the fluid containing the particles to be separated, or isolated from it by a thin membrane, insulating film or the like.

The preferred embodiment is particularly adapted to remove intact biological cells (such as erythrocytes) from a fluid medium (such as whole blood). In this embodiment a fluid driver, or pump, is adapted to drive the fluid medium through the chamber 12 in the capture phase of operation. During this capture phase, the chamber 12 is in the position shown in FIGS. 1, 2 and 4, the plate 52 is passive, and the magnetic field passes through the matrix 30. The cells passing in close proximity to the matrix elements are held, or captured, by those elements due to the forces generated on these particles by the magnetic field, as in conventional HGMS system operation.

As the matrix 30 loading capacity is approached, an elutriation fluid may be substituted for the feed fluid and the elutriation phase begun. During this phase, the chamber 12 is in the position shown in FIGS. 3 and 5 whereby the magnetic field is shunted through the sidewalls 44 and 46, that is, around the matrix 30. Relatively low flow rates, compared to that required by the prior art, suffice to flush the captured particles from the matrix 30, even in the continuing presence of the magnetizing field.

Optionally, in the illustrated embodiment including the piezoelectric plate 52, to permit even lower elutriation flow rates to be used, the drive network 53 drives the plate 52 to generate a high frequency, e.g. 15 KHz, acoustic wave through the fluid in chamber 12. The drive waveform generated by network 53 may be a pulse or pulse train, for example, from an energy storage circuit. Alternatively, the drive waveform may be a periodic oscillation gated off after the captured particles are elutriated, or another suitable waveform. Regardless of the specific drive waveform utilized, acoustic waves set up by the plate in response to the drive dislodge the particles from the matrix, either by driving the matrix 30 mechanically, or by the action of the acoustic waves propagating through the chamber volume. As a result, the captured particles may be removed with lower flow rates than may be permitted by flux diversion alone. The reduction in flow rates during elutriation depends on the strength of the acoustic wave and is more effective with back-loading established by element 54 on the outer surface of the plate 52.

Thus, with the present invention (either with or without the plate 52), the magnet poles 18 and 22, the pole pieces 20 and 24 and the flow chamber 12 form a magnetic switch, which by the mechanical rotation of the flow chamber 12 about the axis 13 diverts the magnetizing flux around the matrix 30 during the elutriation phase. Although in the illustrated embodiment the matrix 30 is shown to be in direct contact with structural elements of the chamber 12, the matrix may alternatively be contained in a suitable, even disposable, cartridge which may be inserted into the rotatable structure of the chamber 12. The pole pieces 20 and 24 and sidewall members 44 and 46 may be mild steel. Alternatively, other high saturation material may be used. If corrosive carrier fluids are allowed to contact the sidewalls 44 and 46, these elements may be magnetic stainless steel. By completing the pole face geometry and creating a short magnetic gap through the chamber and matrix, these magnetic segments establish the desired magnetization field over the matrix volume, permitting efficient capture of the particles to be separated.

When the chamber 12 is in its second position, i.e. during elutriation, the magnetic segments 44 and 46 effectively shunt the magnet gap, diverting the magnetization flux through themselves. If the minimum cross-sectional area of the segment/pole-piece configuration is greater than the saturation area for the segment material at the chosen magnetizing field strength, the residual flux through the matrix 30 is greatly reduced compared to the levels present during the capture phase. The captured particles may then be elutriated with correspondingly reduced fluid velocities, and the chamber may be returned to its capture position for introduction of further feed fluid.

In other embodiments, the sample may be diluted by providing a sampling chamber in one of the cylindrical segments (such as segment 44 or 46) which is filled during the elutriation phase of the previous cycle. During the next capture phase, this sampling chamber is flushed into the chamber housing matrix 30. The flushing may be accomplished with a suitable fluid, such as isotonic saline containing a reductant or oxidant, in one type of blood-cell separation.

The present invention permits the elutriation fluid velocities to be reduced in proportion to the reduction in magnetization field strength in the matrix 30, thus reducing both fluid-shear and matrix-collision forces acting on the cells and thereby decreasing cell fragmentation. This is particularly important when the separation of erythrocytes from whole blood is done to facilitate counting of platelets, where for at least two reasons such fragmentation must be minimized: (1) Each damaged cell may give rise to several fragments which fall within the size range of true platelets; and (2) Because such fragments are smaller than the original erythrocytes for which the matrix is optimized, they will be captured with comparatively low efficiency and so appear in the effluent with the true platelets. Also, in cases where it is desired to separate particles or cells bound to some separable cell or particle, low elutriation forces are essential if the cell and its tagging moiety are to remain associated.

An exemplary configuration can include tapered rectangular cross-section pole pieces 20 and 24. The pole pieces 20 and 24 form a rigid assembly of two opposing mild-steel pole pieces separated by two non-magnetic stainless steel spacers, all silver-soldered together and through-bored to accept the rotary flow chamber 12. In this exemplary configuration a stop plunger was provided to prevent the flow chamber 12 from turning itself into the elutriation position.

With the chamber 12 within the pole assembly, the magnet poles 18 and 22 produced a field of 0.95 T in the matrix volume while the chamber was in the capture position, compared to a field of 0.42 T in that matrix volume with the chamber in the elutriation position, and compared to 0.54 T in the chamber bore with the chamber removed. A further field reduction in the elutriation position can be obtained by optimizing the cross-sectional area of the sidewalls 44 and 46. The matrix 30 within the chamber comprised AISI 430 wire 50 micra in diameter, filling approximately 15% of the chamber volume.

With this configuration, the matrix 30 was magnetized at 1.0 T and one-day old blood was diluted in isotonic saline containing 10 mM dithionite and then passed through the matrix 30. For three capture phases, elutriation was performed by flushing at about 5 filter-volumes/sec with the chamber 12 in the capture position and with zero voltage applied to the plate 52, thereby simulating conventional HGMS operation. Then, for three capture phases, elutriation was performed by flushing at about 2 filter-volumes/sec, i.e. at an elutriation flow rate which was 40% of the prior rate, with the chamber 12 in the elutriation position, again with zero voltage applied to the plate 52, thereby operatively using the configuration of the present invention. In both cases average background-corrected separation efficiencies were calculated from data taken with a COULTER COUNTER ® Model ZB. The data from the "conventional" operation showed 76.3% separation efficiency, and the data from the present invention, i.e. using the flux diverting chamber in its elutriation position, showed 81.6% separation efficiency. In addition, a COULTER ® CHANNELYZER ® unit was used in conjunction with the ZB Counter to determine whether cellular breakup had occurred. The data from the CHANNELYZER unit for the conventional elutriation samples showed a decided debris distribution overlying the usual platelet region. When the invention was used, the data from the CHANNELYZER unit showed a much smaller distribution in this region. The data from the CHANNELYZER unit is supported by the 5% higher separation efficiency for the invention: Because fewer erythrocytes are fragmented during elutriation, more appear to be captured. This is particularly advantageous if erythrocytes are to be removed from a sample intended for platelet counting, since what is important is the ratio of platelets to red cells in the effluent during the capture phase; this ratio may be improved by both better erythrocyte capture and fewer platelet-sized erythrocytic fragments.

FIGS. 6–12 show alternative "dual separator" embodiments of the invention. In those figures, two separators 56A and 56B, each similar to the separator 10 described above in conjunction with FIGS. 1–5, are positioned coaxially along the axis 13A/13B. The chambers 12A and 12B are mechanically coupled by a mechanical linkage indicated by dashed lines 57. That linkage couples the chambers 12A and 12B so that those chambers are selectively rotatable as a unit about the axis 13A/13B by an actuator 59. In FIGS. 6–12, elements corresponding to similar elements in FIGS. 1–5 are identified with identical numerical reference designations but having a suffix designation A for the separator 56A and a suffix designation B for the separator 56B.

Figure 6:
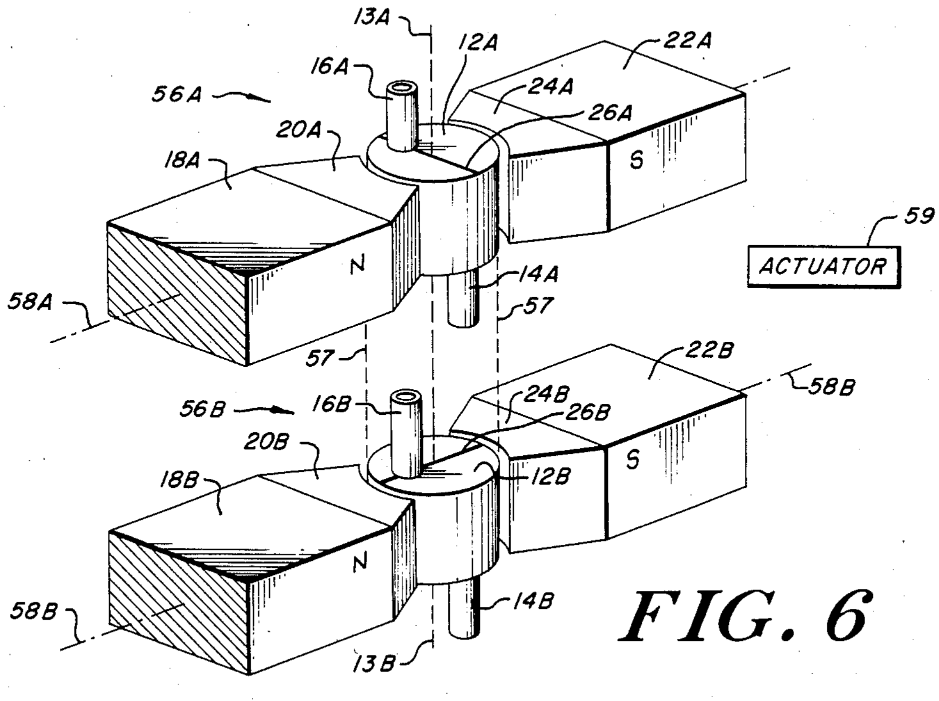

In the configuration of FIG. 6, a first magnetic circuit is established by the poles 18A and 22A along polar axis 58A and a second magnetic circuit is established by the poles 18B and 22B along polar axis 58B. The magnet poles 18A and 22A are aligned with and overlie the magnet poles 18B and 22B, and the chamber 12A is rotationally offset about the axis 13 by ninety degrees with respect to the chamber 12B. FIG. 12 shows a sectional view of the configuration of FIG. 6. Alternatively, the magnet poles 18A and 18B may be a single magnet pole and the magnet poles 22A and 22B may be a single magnetic pole.

With the configuration of FIGS. 6 and 12, when one of chambers 12A and 12B is in its first, or capture, position, i.e., so that the magnetic flux from its associated magnet poles passes through its matrix, the other of chambers 12A and 12B is in its second, or elutriation, position so that the magnetic flux from its associated magnet poles is shunted around its matrix.

With the configuration of FIGS. 6 and 12, except during the switching of positions, one of the chambers 12A and 12B is in its capture phase of operation while the other is in its elutriation phase. As the orientation is being switched, the magnetic field assists the switching since as the reluctance between the poles of one magnetic circuit increases in the chamber being switched from its capture position, the reluctance between the poles of the other magnetic circuit decreases in the chamber being switched from its elutriation position. Consequently, the configuration of FIGS. 6 and 12 requires less power to switch the chambers 12A and 12B between their operating positions, compared to that required for a similar single separator in the form of the separator 10, and a relatively low power actuator 59 may be used to accomplish the switching.

Figure 7:
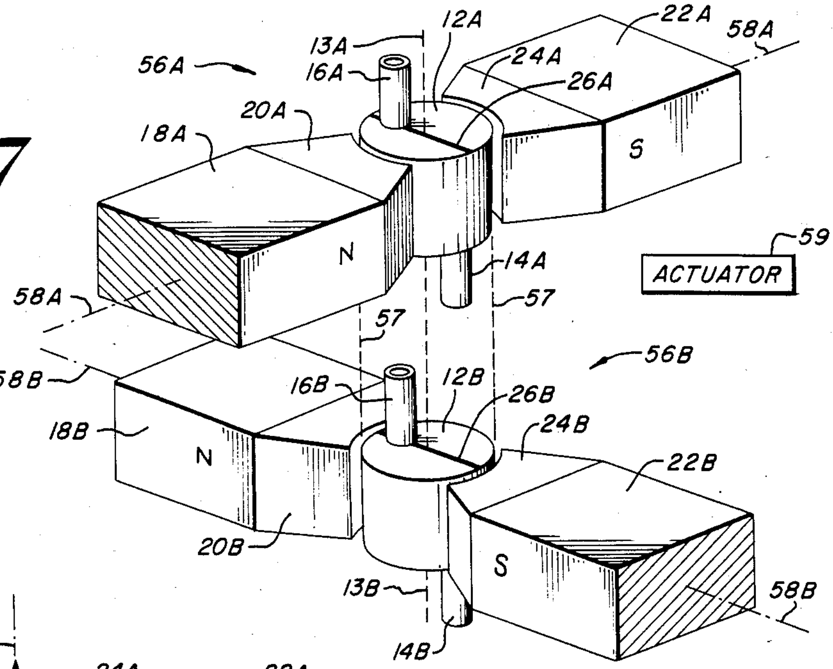

FIG. 7 shows a dual separator configuration similar to that of FIG. 6, except that the magnet poles 18A and 22A are rotationally offset from the magnet poles 18B and 22B by ninety degrees about the axis 13, and the chambers 12A and 12B are aligned with each other. This configuration is functionally equivalent to the configuration of FIG. 6. Here, too, when one of chambers 12A and 12B is in its capture position, the other is in its elutriation position, and the switching of chambers 12A and 12B between positions is assisted by the magnetic field. Again, only a relatively low power actuator 59 is required, compared to a similar single separator.

Figure 8:
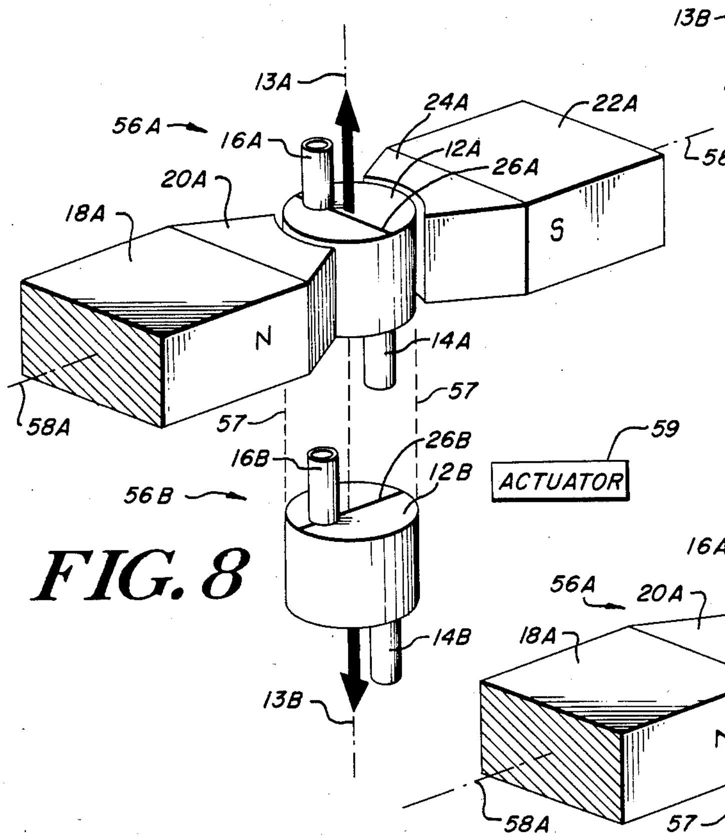

FIG. 8 shows another dual separator configuration. In that configuration, a single pair of magnetic poles 18A and 22A is used in conjunction with the actuator 59. The chamber 12A is rotationally offset from the chamber 12B by ninety degrees about the axis 13. In operation, as the chambers 12A and 12B are rotated by the actuator 59, the switching of the chambers both rotationally and axially is assisted by the magnetic field so that either chamber 12A is in its capture position in the magnetic field between poles 18A and 22A or chamber 12B is in its capture position in that field, while the other chamber is positioned outside the field. With this configuration, only a relatively low power actuator 59 is required since as the reluctance in the flux path between the poles increases in the chamber being switched from its capture position, the reluctance in that flux path decreases in the chamber being switched from its elutriation position, and the magnetic field assists the pull-in of the latter chamber. The configuration is particularly advantageous compared with those of FIGS. 6 and 7 because only one-half of the magnetizing flux is required from the magnetic poles 18A and 22A.

In the configurations of each of FIGS. 6–8, the separators 56A and 56B are preferably operated independently so that one separator is always operated in its capture phase, while the other separator is operated in its elutriation phase. This simultaneous filtering and flushing in the separator pair provides efficient operation with high system throughput. Different samples, or "splits" of a single sample, can be exposed to the same or different protocols in the two separators 56A and 56B. For example, the two capture phases may differ in reagents and/or flow rates, as can the two elutriation phases. Additionally, in the configuration of FIG. 8 the two chambers 12A and 12B may differ in their segment or internal geometry or in the material, geometry, dimensions or filling factor of their matrices 30. Further, in the configurations of FIGS. 6 and 7 the two magnetization circuits may differ in their magnetization intensities or other characteristics. The great variety of potential protocols is of particular value when particles or cells must be separated from ones similar in many of their properties.

Figure 9:
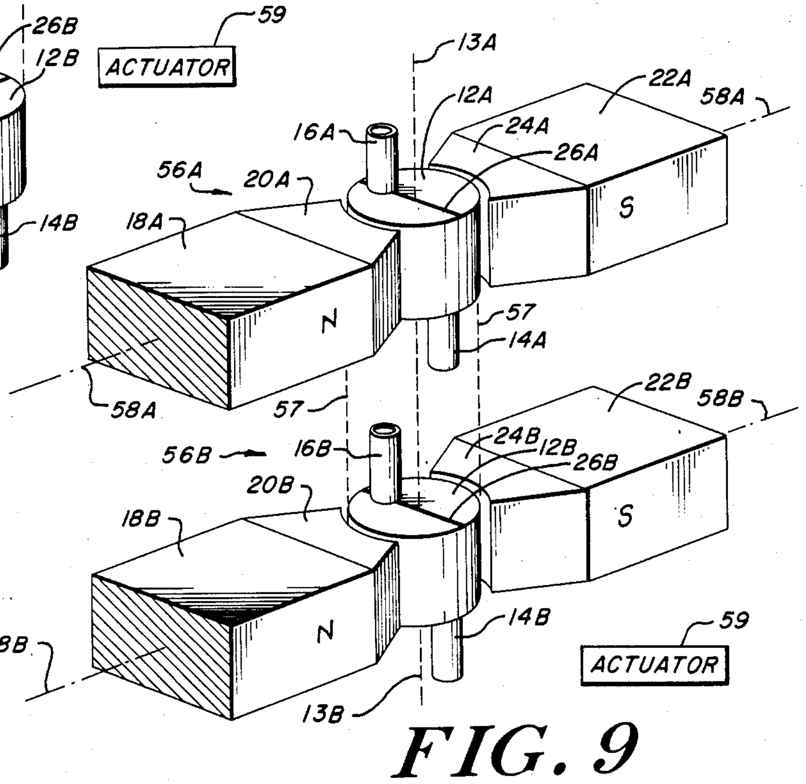

FIGS. 9, 10 and 11 show configurations similar to those in FIGS. 6, 7 and 8, respectively, except that in each configuration, the chambers 12A and 12B are both aligned in the same manner with respect to the magnetic field. Consequently, each configuration requires a more powerful rotational actuator than its counterpart configuration in the respective ones of FIGS. 6, 7 and 8. In effect twice the power is required as for a single separator comparable to one of the separators 56A or 56B. The configuration of FIG. 11 also requires an actuator that provides a substantial linear force along the common axis 13, in addition to the required rotary motion.

In each of the configurations of FIGS. 9 and 10, the separators 56A and 56B may be operated independently to obtain the advantages described for the configurations of FIGS. 6 and 7, but the latter offer better throughput and require less powerful activators 59. However, with the two separators operated in series, with port 16B being coupled to port 14A in the configurations of FIGS. 9 and 10, a single sample can undergo a compound filtration wherein any combination of chamber, matrix, and magnetization characteristics may be individually selected for the two chambers 12A and 12B. Thus, additional flexibility is obtained, e.g. to fractionate cells according to type or the same type according to some useful differentiating characteristic. Alternatively, these configurations can provide larger processed volumes per operational cycle, if ports 14A and 16A of chamber 12A are connected to the corresponding ports of chamber 12B and the two chambers have equivalent filtration characteristics.

The configuration of FIG. 11 can more readily be designed to permit repeated sequential use of only chamber 12A or chamber 12B than can the configuration of FIG. 8. In some cases it may be advantageous to operate separators 56A and 56B in series in this configuration, with port 16B being coupled to 14A and a lesser matrix filling factor being used in chamber 12B, to provide a mechanical prefilter for the magnetic filtration done in chamber 12A.

Figure 13:
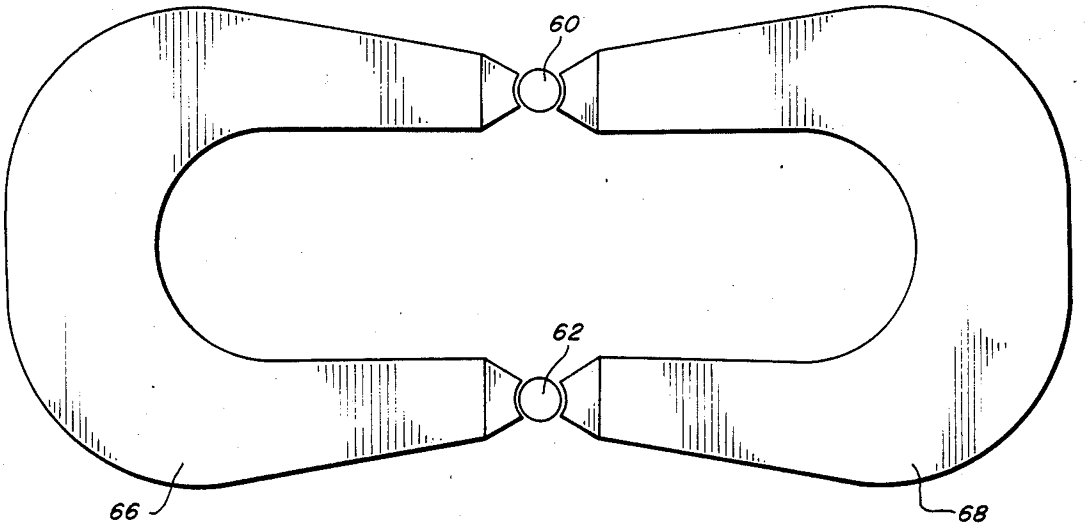
FIG. 13 shows an alternative dual separator embodiment of the invention.

FIG. 13 shows a top view of an alternative form of the invention including two separators 60 and 62, for example, each having the same form as the separator 10. Two horseshoe, or C-shaped, permanent magnets 66 and 68 are adapted to provide the magnetic field used with the separators 60 and 62. This arrangement is particularly easy to implement with readily available magnets. Each of the C-shaped magnets may also be effected by a sequential array of separate magnets, where between adjacent magnets can be another separator, or flux coupler if needed. Moreover in various forms of this embodiment, either of the separators 60 or 62 can be replaced with a high permeability element so that a single separator system may be established. In other embodiments, the separators 60 and 62 each may be dual separators, for example, as shown in FIGS. 6–12, with the addition of another set of magnets, as necessary.

The invention can be embodied in other specific forms without departing from the spirit or essential characteristics thereof. The present embodiments therefore are to be considered in all respects as illustrative and not restrictive, the scope of the invention being indicated by the appended claims rather than by the foregoing description, and all changes which come within the meaning and range of equivalency of the claims therefore are intended to be embraced therein.

We claim:

1. Separator apparatus for separating magnetic particles from a fluid medium, comprising:

a first separator including:

a housing defining a first flow chamber having at least one input port and at least one output port and extending along a first reference axis, said chamber defining a fluid flow path therethrough from one of said input ports to one of said output ports, a first high magnetic permeability, interstitial separation matrix positioned within said flow chamber whereby fluid flowing between said input and output ports passes substantially through interstices in said matrix, a first magnetizing means for selectively coupling magnetic flux to said matrix, wherein said first magnetizing means includes two opposite polarity magnet poles positioned external to said chamber and on opposite sides of said first reference axis and wherein said flow chamber includes within said housing relatively high magnetic permeability elements external to said matrix, said elements including means for establishing a flux path between the poles of said first magnetizing means in each of a first position and a second position of said chamber, said chamber being selectively rotatable about said first reference axis between said first position and said second position, whereby:

when said elements are in said first position, a first flux path is established from one magnet pole of said first magnetizing means through said matrix to the other magnet pole of said first magnetizing means, and when said elements are in said second position, a relatively low reluctance second flux path is established from said one magnet pole of said first magnetizing means through said elements to said other magnet pole of said first magnetizing means substantially external to said matrix.

2. A separator apparatus according to claim 1 comprising said first separator and a second separator, said second one separator including:

a housing defining a second flow chamber having at least one input port and at least one output port and extending along a second reference axis, said chamber defining a fluid flow path therethrough from one of said input ports to one of said output ports, a second high magnetic permeability, interstititial separation matrix positioned within said flow chamber whereby fluid flowing between said input and output ports passes substantially through interstices in said matrix, a second magnetizing means for selectively coupling magnetic flux to said matrix, wherein said second magnetizing means includes two opposite polarity magnet poles positioned external to said chamber and on opposite sides of said second reference axis and wherein said flow chamber includes within said housing relatively high magnetic permeability elements external to said matrix, said elements including means for establishing a flux path between the poles of said second magnetizing means in each of a first position and a second position, said chamber being selectively rotatable about said second reference axis between said first position and said second position, whereby:

when said elements are in said first position, a first flux path is established from one magnet pole of said second magnetizing means through said matrix to the other magnet pole of said magnetizing means, and when said elements are in said second position, a relatively low reluctance flux second path is established from said one magnet pole of said second magnetizing means through said elements to said other magnet pole of said second magnetizing means substantially external to said matrix, wherein said first and second flow chambers are rigidly coupled whereby said first and second reference axes are coaxial with a common axis.

3. Separator apparatus according to claim 2 wherein the poles of said first magnetizing means are positioned along a first polar axis and the poles of said second magnetizing means are positioned along a second polar axis, wherein said first polar axis is parallel to said second polar axis, and including means for mechanically coupling said first and second flow chambers so that said first flow chamber is in its first position with respect to said magnetic poles of said first magnetizing means when said second flow chamber is in its second position with respect to said magnetic poles of said second magnetizing means, and said first flow chamber is in its second position with respect to said magnet poles of said first magnetizing means when said second chamber is in its first position with respect to said magnet poles of said second magnetizing means.

4. Separator apparatus according to claim 2 wherein the poles of said first magnetizing means are positioned along a first polar axis and the poles of said second magnetizing means are positioned along a second polar axis, wherein said first polar axis is parallel to said second polar axis, and including means for mechanically coupling said first and second flow chambers so that said first flow chamber is in its first position with respect to said magnetic poles of said first magnetizing means when said second flow chamber is in its first position with respect to said magnetic poles of said first magnetizing means when said second flow chamber is in its first position with respect to said magnetic poles of said second magnetizing means, and said first flow chamber is in its second position with respect to said magnet poles of said first magnetizing means when said second chamber is in its second position with respect to said magnet poles of said second magnetizing means.

5. A separator apparatus according to claim 4 wherein said one output port of said first flow chamber is coupled to said one input port of said second flow chamber.

6. Separator apparatus according to claim 2 wherein the poles of said first magnetizing means are positioned along a first polar axis and the poles of said second magnetizing means are positioned along a second polar axis, wherein said first polar axis is perpendicular to said second polar axis, and including means for mechanically coupling said first and second flow chambers so that said first flow chamber is in its first position with respect to said magnetic poles of said first magnetizing means when said second flow chamber is in its second position with respect to said magnetic poles of said second magnetizing means, and said first flow chamber is in its second position with respect to said magnet poles of said first magnetizing means when said second chamber is in its first position with respect to said magnet poles of said second magnetizing means.

7. Separator apparatus according to claim 2 wherein the poles of said first magnetizing means are positioned along a first polar axis and the poles of said second magnetizing means are positioned along a second polar axis, wherein said first polar axis is perpendicular to said second polar axis, and including means for mechanically coupling said first and second flow chambers so that said first flow chamber is in its first position with respect to said magnetic poles of said first magnetizing means when said second flow chamber is in its first position with respect to said magnetic poles of said second magnetizing means, and said first flow chamber is in its second position with respect to said magnet poles of said first magnetizing means when said second chamber is in its second position with respect to said magnet poles of said second magnetizing means.

8. A separator apparatus according to claim 7 wherein said one output port of said first flow chamber is coupled to said one input port of said second flow chamber.

9. Separator apparatus according to claim 2 wherein said first and second separators are movable between two positions along said common axis, and wherein said first and second magnetizing means comprise a common pair of opposite polarity magnet poles, said common pair being adapted to couple said magnetic flux substantially to one of said flow chambers when said separators are in one of said positions and substantially to the other of said flow chambers when said separators are in the other of said positions.

10. Separator apparatus according to claim 9 including means for controlling the orientation of said first and second flow chambers so that said first flow chamber is in its first position with respect to said common pair of magnetic poles when said second flow chamber is in its second position with respect to said common pair of magnetic poles, and said first flow chamber is in its second position with respect to said common pair of magnet poles when said second chamber is in its first position with respect to said common pair of magnet poles.

11. Separator apparatus according to claim 9 including means for controlling the orientation of said first and second flow chambers so that said first flow chamber is in its first position with respect to said common pair of magnetic poles when said second flow chamber is in its first position with respect to said common pair of magnetic poles, and said first flow chamber is in its second position with respect to said common pair of magnet poles when said second chamber is in its second position with respect to said common pair of magnet poles.

12. A separator apparatus according to claim 1 further comprising means for supporting said housing whereby said one input port is lower than said one output port.

13. A separator apparatus according to claim 1 wherein said fluid flow path extends through said matrix substantially along a fluid flow axis which is offset with respect to a local vertical axis.

14. A separator apparatus according to claim 13 wherein said offset is substantially equal to forty-five degrees.

15. A separator apparatus according to claim 1 wherein said magnetizing means comprises a pair of C-shaped permanent magnets with the North pole of each of said magnets being positioned opposite the South pole of each of said magnets wherein said flow chamber is positioned between one set of said oppositely positioned North and South poles, and further comprises means to couple magnetic flux between said North and South poles of said other set of oppositely positioned North and South poles.

16. A separator apparatus according to claim 1 wherein the reluctance of said first flux path is relatively high compared to the reluctance of said second flux path.

* * * * *